(12) United States Patent
Xu

(10) Patent No.: US 12,399,499 B2
(45) Date of Patent: Aug. 26, 2025

(54) DOCKING APPARATUS, MOBILE ROBOT, AND DOCKING METHOD FOR DOCKING APPARATUS

(71) Applicant: Jingdong Technology Information Technology Co., Ltd., Beijing (CN)

(72) Inventor: Zhetao Xu, Beijing (CN)

(73) Assignee: Jingdong Technology Information Technology Co., Ltd., Beijing (CN)

( * ) Notice: Subject to any disclaimer, the term of this patent is extended or adjusted under 35 U.S.C. 154(b) by 237 days.

(21) Appl. No.: 17/632,143

(22) PCT Filed: Aug. 6, 2020

(86) PCT No.: PCT/CN2020/107278
§ 371 (c)(1),
(2) Date: Feb. 1, 2022

(87) PCT Pub. No.: WO2021/027665
PCT Pub. Date: Feb. 18, 2021

(65) Prior Publication Data
US 2023/0125504 A1 Apr. 27, 2023

(30) Foreign Application Priority Data

Aug. 13, 2019 (CN) .......................... 201910745386.1

(51) Int. Cl.
*G05D 1/00* (2024.01)
*B64G 1/64* (2006.01)

(52) U.S. Cl.
CPC ......... *G05D 1/0225* (2013.01); *B64G 1/6462* (2023.08); *G05D 1/0231* (2013.01)

(58) Field of Classification Search
CPC .. G05D 1/0225; G05D 1/0231; G05D 1/0236; G05D 1/0234; G05D 1/0242;
(Continued)

(56) References Cited

U.S. PATENT DOCUMENTS 3,224,709 A 12/1965 Blizard
6,176,505 B1 1/2001 Capik et al.
(Continued)

FOREIGN PATENT DOCUMENTS

CN 101779289 A 7/2010
CN 103425005 A 12/2013
(Continued)

OTHER PUBLICATIONS

Trnaslation of CN-104750115-A retrieved from PE2E Search on Feb. 20, 2024 (Year: 2024).*
(Continued)

*Primary Examiner* — Fadey S. Jabr
*Assistant Examiner* — Faris Asim Shaikh
(74) *Attorney, Agent, or Firm* — Blank Rome LLP

(57) ABSTRACT

Embodiments of the present disclosure disclose a docking apparatus, a mobile robot, and a docking method for the docking apparatus. The docking apparatus comprises a processor and a plurality of photosensitive devices electrically connected to the processor, wherein the processor determines, from the plurality of photosensitive devices, a photosensitive device receiving a laser light, the laser light being emitted by an opposite-end apparatus to be docked with the docking apparatus. The connection apparatus, according to a position offset between the photosensitive device receiving the laser light and a target photosensitive device, is controlled to move to a docking position calibrated by means of the target photosensitive device, such that the docking apparatus and the opposite-end apparatus are docked with each other. The embodiments help improve the accuracy of docking between the connection apparatus and the opposite-end apparatus.

17 Claims, 8 Drawing Sheets

(58) Field of Classification Search
CPC .. G05D 1/0248; G05D 1/0246; G05D 1/0212; G05D 1/021; G05D 1/0276; G05D 2109/10; G05D 2109/135; G05D 2109/13; G05D 2107/40; G05D 2107/60; G05D 2107/63; G05D 2107/65; G05D 2107/67; G05D 2107/68; G05D 2107/70; G05D 2105/10; G05D 1/43; B64G 1/646; B25J 9/16; B25J 5/00; B25J 9/1679; A47L 2201/02; A47L 2201/04; A47L 2201/022; A47L 2201/024; A47L 2201/026; A47L 2201/00; G01J 5/0896
See application file for complete search history.

(56) References Cited

U.S. PATENT DOCUMENTS

| | | | | |
|---|---|---|---|---|
| 6,278,917 | B1* | 8/2001 | Bauer | G05D 1/0225 901/1 |
| 6,320,618 | B1* | 11/2001 | Aoyama | H04N 25/533 348/E3.018 |
| 6,658,329 | B1 | 12/2003 | Howard et al. | |
| 9,153,614 | B2 | 10/2015 | Tuttle | |
| 9,857,473 | B2* | 1/2018 | Kim | G01S 7/4814 |
| 9,948,391 | B2 | 4/2018 | Breuer et al. | |
| 2011/0153205 | A1 | 6/2011 | Stimac et al. | |
| 2012/0112684 | A1* | 5/2012 | Xu | B60L 53/22 320/101 |
| 2013/0214726 | A1* | 8/2013 | Teng | G01J 5/028 250/349 |
| 2014/0361394 | A1* | 12/2014 | Zivkovic | H01L 27/14623 438/66 |
| 2018/0036890 | A1 | 2/2018 | Hollister | |
| 2018/0180421 | A1 | 6/2018 | Holtz | |
| 2019/0155295 | A1* | 5/2019 | Moore | G05D 1/0225 |
| 2019/0306442 | A1* | 10/2019 | Murakami | H04N 25/77 |
| 2020/0306989 | A1* | 10/2020 | Vogel | B25J 9/1653 |
| 2020/0387165 | A1* | 12/2020 | Wang | B25J 11/0085 |
| 2020/0409382 | A1* | 12/2020 | Herman | A47L 9/2889 |
| 2021/0176413 | A1* | 6/2021 | Inoue | H01L 27/14612 |
| 2021/0311174 | A1* | 10/2021 | Jiang | G01S 7/489 |

FOREIGN PATENT DOCUMENTS

| | | | | |
|---|---|---|---|---|
| CN | 204408031 | U * | 6/2015 | |
| CN | 104750115 | A * | 7/2015 | |
| CN | 105119338 | A | 12/2015 | |
| CN | 105798922 | A | 7/2016 | |
| CN | 106415301 | A | 2/2017 | |
| CN | 107392962 | A | 11/2017 | |
| CN | 107598935 | A | 1/2018 | |
| CN | 107844204 | A | 3/2018 | |
| CN | 108885264 | A | 11/2018 | |
| CN | 109491382 | A | 3/2019 | |
| EP | 3391085 | B1 | 4/2023 | |
| KR | 20180094300 | A | 8/2018 | |
| WO | WO-2017020641 | A1 * | 2/2017 | G01C 1/00 |

OTHER PUBLICATIONS

Translation of WO-2017020641-A1 retrieved from PE2E Search on Feb. 20, 2024 (Year: 2024).*
Translation of CN-204408031-U retrieved from Espacenet on Feb. 20, 2024 (Year: 2024).*
International Search Report for PCT/CN2020/107278, dated Nov. 16, 2020, 2 pages.

* cited by examiner

DOCKING APPARATUS, MOBILE ROBOT, AND DOCKING METHOD FOR DOCKING APPARATUS

RELATED APPLICATIONS

This patent application is a national stage of International Application No. PCT/CN2020/107278, filed on Aug. 6, 2020, which claims the priority from Chinese Application No. 201910745386.1, filed on Aug. 13, 2019, entitled "DOCKING APPARATUS, MOBILE ROBOT, AND DOCKING METHOD FOR DOCKING APPARATUS". Both of the aforementioned applications are hereby incorporated by reference in their entireties.

TECHNICAL FIELD

Embodiments of the present disclosure relate to the field of electrical control, in particular to a docking apparatus, a mobile robot, and a docking method for the docking apparatus.

BACKGROUND

In many application scenarios, two apparatus need to be docked to achieve relative fixation therebetween. During the docking process, generally, one apparatus is kept fixed, and the other apparatus is moved to realize the docking therebetween, or both apparatuses are moved to realize the docking. At present, the docking methods for the docking apparatus mainly include: "ring-cone" type, "rod-cone" type, "different body and isomorphic peripheral" type, "gripper-collision lock" type and so on.

For example, a spacecraft docking apparatus may be used to realize the docking, connection and separation between spacecrafts. Through it, a mechanical connection, an electrical connection, and/or a hydraulic connection of two spacecrafts can be realized. After the two are spacecrafts connected to form an orbital complex, the transfer of people and materials can be realized.

In addition, in the design of some mobile robots (such as food delivery robots) that have the function of carrying and transporting, various components that need to be electrically connected are often designed in an integrated manner.

SUMMARY

The present disclosure proposes a docking apparatus, a mobile robot, and a docking method for the docking apparatus.

In a first aspect, an embodiment of the present disclosure provides a docking apparatus, comprising a processor and a plurality of photosensitive components electrically connected to the processor, where: the processor determines, from the plurality of photosensitive components, a photosensitive component that receives a laser light, where the laser light is emitted by an opposite-end apparatus to be docked with the docking apparatus; and the processor controls, based on a positional deviation between the photosensitive component that receives the laser light and a target photosensitive component, the docking apparatus to move to a docking position calibrated by the target photosensitive component, so that the docking apparatus docks with the opposite-end apparatus.

In some embodiments, the docking position is a position where the target photosensitive component receives the laser light emitted by the opposite-end apparatus.

In some embodiments, the plurality of photosensitive components are arranged in an array, and the target photosensitive component is located at a center of the array formed by an arrangement of the plurality of photosensitive components.

In some embodiments, the processor determines, from the plurality of photosensitive components, the photosensitive component that receives the laser light by: determining, from the plurality of photosensitive components, a photosensitive component with a voltage across two ends thereof being greater than or equal to a preset voltage threshold as the photosensitive component that receives the laser light.

In some embodiments, the opposite-end apparatus stops emitting the laser light in response to determining that the docking apparatus is successfully docked with the opposite-end apparatus, and emits the laser light in response to determining that the docking apparatus is not docked with the opposite-end apparatus; or the processor further controls the opposite-end apparatus to suspend emitting the laser light in response to determining that the docking apparatus is successfully docked with the opposite-end apparatus, and the processor controls the opposite-end apparatus to emit the laser light in response to determining that the docking apparatus is not docked with the opposite-end apparatus.

In some embodiments, a switch for controlling laser light emission is provided on the opposite-end apparatus, the switch is turned off when the opposite-end apparatus and the docking apparatus are successfully docked, to suspend emitting the laser light, and the switch is turned on when the opposite-end apparatus and the docking apparatus are not docked, to emit the laser light.

In some embodiments, the docking apparatus further includes a laser radar positioning system, where the processor further controls, based on a relative position of the docking apparatus and the opposite-end apparatus determined by the laser radar positioning system, the docking apparatus to move to a position that allows a photosensitive component in the plurality of photosensitive components to receive the laser light emitted by the opposite-end apparatus.

In some embodiments, the photosensitive component is a photoresistor or a photodiode.

In a second aspect, an embodiment of the present disclosure provides a mobile robot, where the above-mentioned mobile robot includes the docking apparatus according to any one of the embodiments in the above-mentioned first aspect.

In a third aspect, an embodiment of the present disclosure provides a docking method for a docking apparatus, where the docking apparatus including a plurality of photosensitive components, the method includes: determining, from the plurality of photosensitive components, a photosensitive component that receives a laser light, wherein the laser light is emitted by an opposite-end apparatus to be docked with the docking apparatus; and controlling, based on a positional deviation between the photosensitive component that receives the laser light and a target photosensitive component, the docking apparatus to move to a docking position calibrated by the target photosensitive component, so that the docking apparatus docks with the opposite-end apparatus.

In some embodiments, where, the determining, from the plurality of photosensitive components, a photosensitive component that receives a laser light, includes: determining, from the plurality of photosensitive components, a photosensitive component with a voltage across two ends thereof being greater than or equal to a preset voltage threshold as the photosensitive component that receives the laser light.

In a fourth aspect, the embodiments of the present disclosure provide an electronic device, including: one or more processors; a plurality of photosensitive components, in electronic connection with the one or more processors; and a memory device, stores one or more programs thereon, the one or more programs, when executed by the one or more processors, cause the one or more processors to implement the method according to any one of embodiments in the first aspect.

In a fifth aspect, the embodiments of the present disclosure provide a computer readable medium, storing a computer program thereon, the program, when executed by a processor, implement the method according to any one of embodiments in the first aspect.

BRIEF DESCRIPTION OF THE DRAWINGS

By reading the detailed description of the non-limiting embodiments with reference to the following drawings, other features, purposes and advantages of the present disclosure will become more apparent.

DETAILED DESCRIPTION OF EMBODIMENTS

Embodiments of the present disclosure will be described below in detail by combining the accompanying drawings. It should be appreciated that detailed embodiments described herein are merely used for explaining the relevant disclosure, rather than limiting the disclosure. In addition, it should be noted that, for the ease of description, only the parts related to the relevant disclosure are shown in the accompanying drawings.

It should also be noted that embodiments in the present disclosure and the features in the embodiments may be combined with each other on a non-conflict basis. The present disclosure will be described below in detail with reference to the accompanying drawings and in combination with the embodiments.

Figure 1:
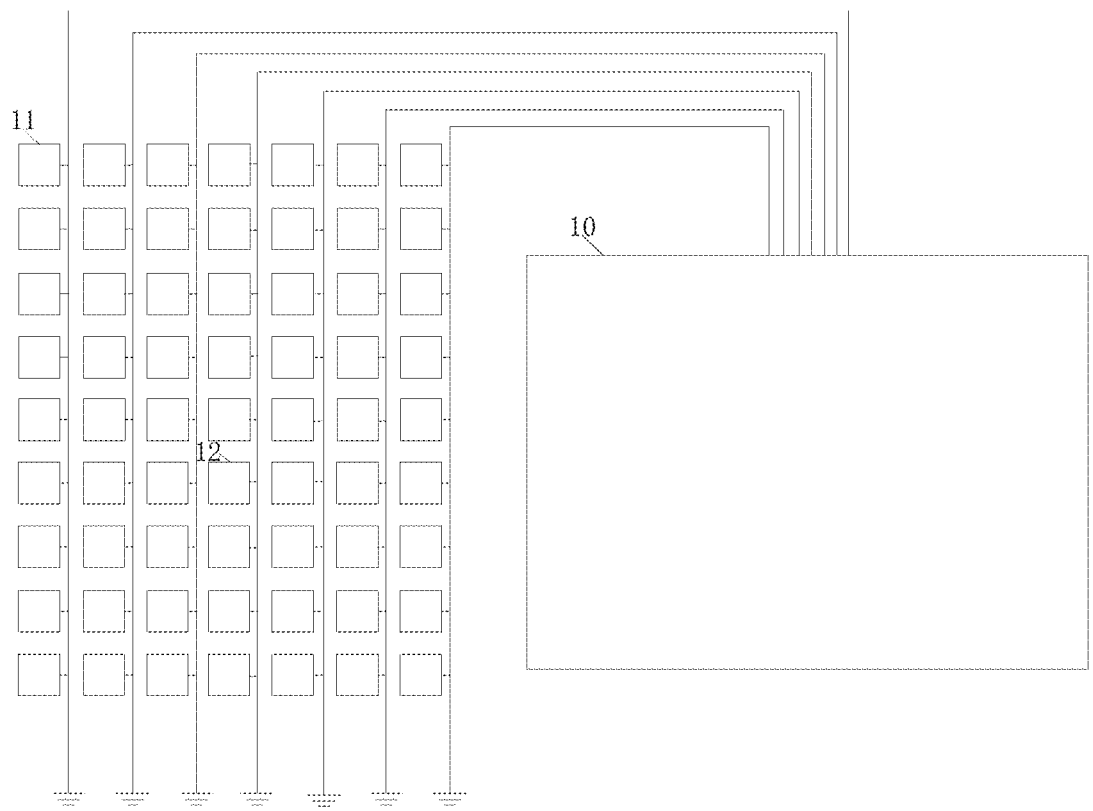
FIG. 1 is a schematic structural diagram of a docking apparatus according to an embodiment of the present disclosure.

Please refer to FIG. 1, which is a schematic structural diagram of a docking apparatus according to an embodiment of the present disclosure.

As shown in FIG. 1, the docking apparatus includes a processor 10 and a plurality of photosensitive components 11 electrically connected to the processor 10. The plurality of photosensitive components 11 includes a target photosensitive component 12.

Here, the processor 10 first determines, from the above-mentioned plurality of photosensitive components, the photosensitive component that receives a laser light. Here, the above-mentioned laser light is emitted by an opposite-end apparatus to be docked with the above-mentioned docking apparatus. Then, the processor 10 controls, based on the positional deviation between the above-mentioned photosensitive component that receives the laser light and the target photosensitive component 12, the above-mentioned docking apparatus to move to a docking position calibrated by the above-mentioned target photosensitive component 12, so that the above-mentioned docking apparatus docks with the above-mentioned opposite-end apparatus.

Here, the above-mentioned opposite-end apparatus may emit laser light through a laser light transmitter fixedly installed on the opposite-end apparatus. The position of the target photosensitive component may be used to calibrate the docking position between the docking apparatus and the opposite-end apparatus docked with the docking apparatus.

Figure 2A:
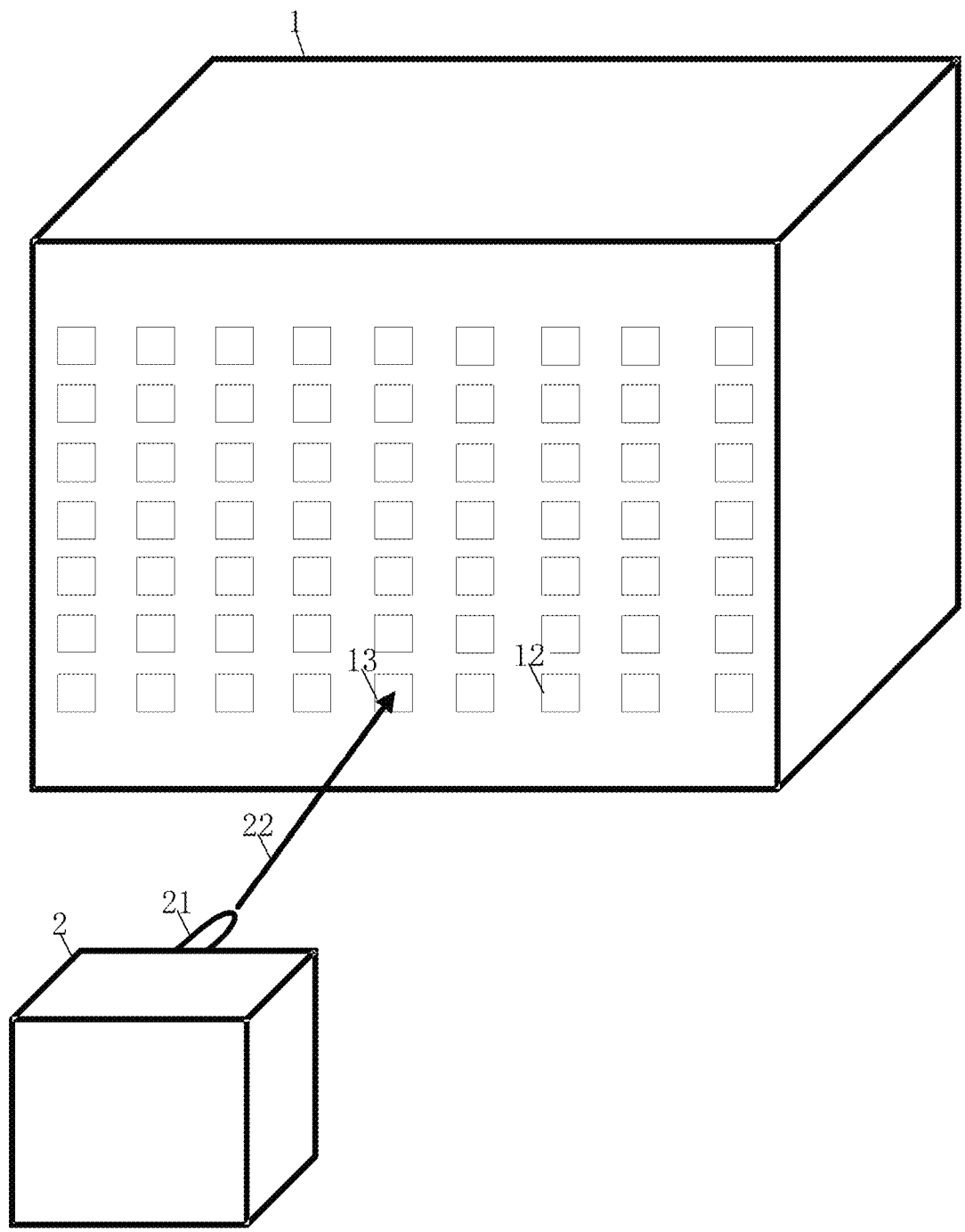
FIGS. 2A and 2B are schematic diagrams of docking a docking apparatus and an opposite-end apparatus according to the present disclosure.
Figure 2B:
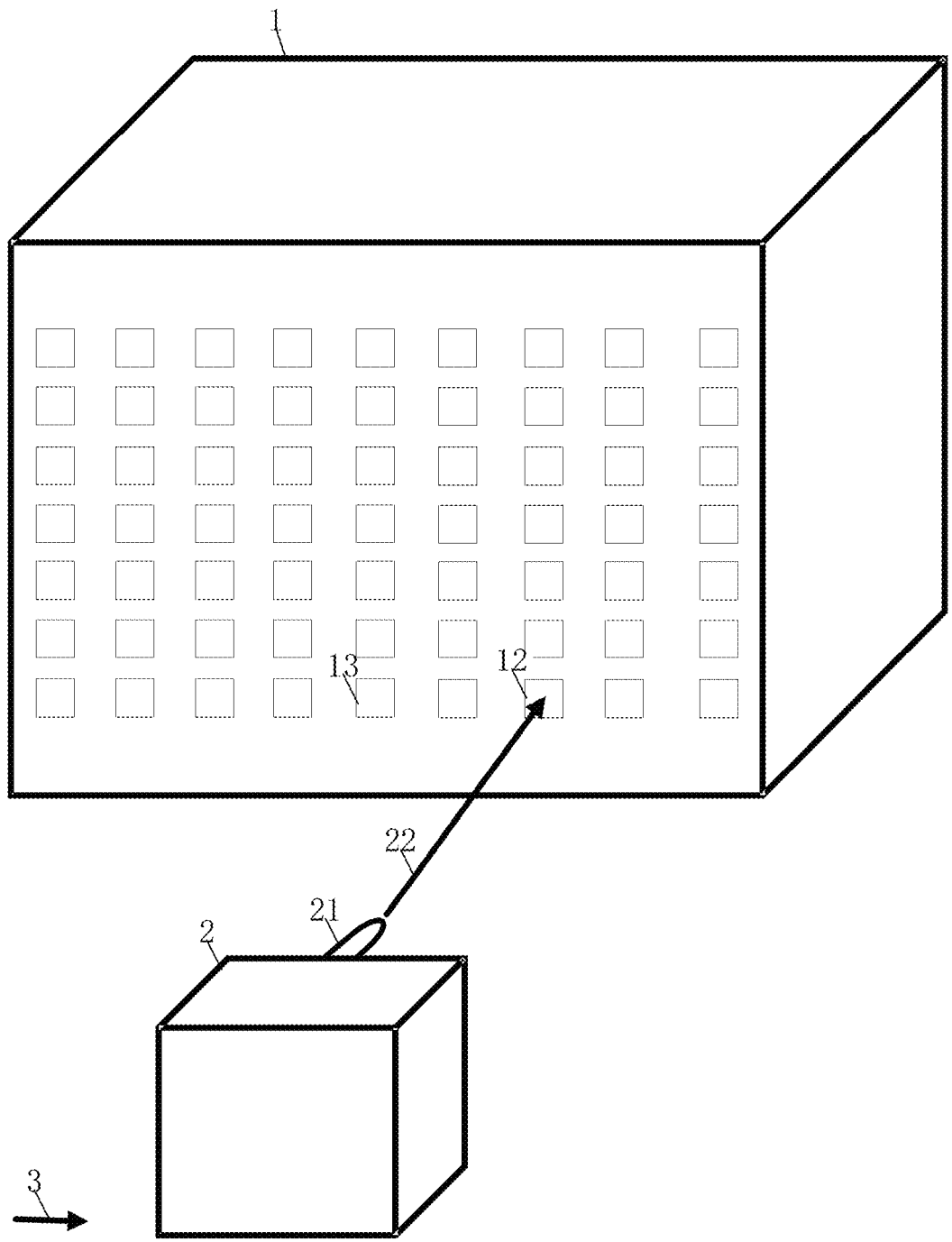

As an example, please refer to FIGS. 2A and 2B. FIGS. 2A and 2B are schematic diagrams of docking the docking apparatus and the opposite-end apparatus according to the present disclosure.

As shown in FIG. 2A, the opposite-end apparatus 2 includes a laser light transmitter 21 fixedly mounted thereon. The laser light transmitter 21 may emit a laser light 22. When the laser light transmitter 21 emits the laser light 22 to a location area where the plurality of photosensitive components included in the docking apparatus 1 are located, the resistance of the photosensitive component that receives the laser light 22 among the plurality of photosensitive components will decrease. Thus, the processor 10 electrically connected to the plurality of photosensitive components may determine the photosensitive component 13 that receives the laser light 22 based on the resistance or voltage of each photosensitive component. Here, the position information of each photosensitive component may be stored in the processor 10 in advance.

Referring now to FIG. 2B, The processor 10 may compute the position deviation between the photosensitive component 13 that receives the laser light and the target photosensitive component 12. Here, the position deviation indicates the relative position between the photosensitive component 13 that receives the laser light and the target photosensitive component 12 (for example, the distance between the photosensitive component 13 that receives the laser light and the target photosensitive component 12, the direction of the target photosensitive component 12 relative to the photosensitive component 13 that receives the laser light). After obtaining the position deviation, the processor 10 may control the above-mentioned docking apparatus 1 to move to the docking position calibrated by the above-mentioned target photosensitive component 12, so that the above-mentioned docking apparatus 1 is docked with the above-mentioned opposite-end apparatus 2.

The size of each of the above-mentioned photosensitive components may be preset, and the light-sensing area of each photosensitive component is limited. Since the position of the laser light transmitter is fixed, a condition that a different photosensitive component receives the laser light may indicate that the docking apparatus and the opposite-end apparatus are in a different relative position.

The size, model, parameters (for example, the highest reverse working voltage, junction capacitance, resistance) and other attributes of the above-mentioned photosensitive components may be the same or different from each other. As an example, at least one of the above-mentioned plurality of photosensitive components may have a size different from other photosensitive components other than the at least one photosensitive component in the above-mentioned plurality of photosensitive components.

It may be understood that, in this embodiment, the above-mentioned docking position indicates the relative position at which the docking apparatus and the opposite-end apparatus to be docked with the docking apparatus can be successfully docked, and the docking position may be calibrated by the target photosensitive 12.

In some optional implementations of this embodiment, the above-mentioned docking position is a position where the target photosensitive component receives the laser light emitted by the above-mentioned opposite-end apparatus. When the laser light emitted by the laser light transmitter installed in the fixed position of the opposite-end apparatus is received by the target photosensitive component, the relative position of the docking apparatus and the opposite-end apparatus to be docked therewith is the calibrated docking position, and the docking apparatus and the opposite-end apparatus may be successfully docked.

When the above-mentioned docking position is the position where the above-mentioned target photosensitive component receives the laser light emitted by the above-mentioned opposite-end apparatus, in the application scenario shown in FIG. 2B, the distance the docking apparatus 1 moves is the distance between the photosensitive component 13 that receives the laser light and the target photosensitive component 12. The direction in which the docking apparatus 1 moves is a direction with the position of the target photosensitive component 12 as the starting point and with the position of the photosensitive component 13 that receives the laser light as the ending point. Thus, after obtaining the direction the docking apparatus is instructed to move in and the distance the docking apparatus is instructed to move, the processor 10 may control the docking apparatus 1 to move in accordance with the obtained direction and distance, so that to cause the above-mentioned docking apparatus 1 to be docked with the above-mentioned opposite-end apparatus 2.

It may be understood that, compared with the solution where the docking position is a position where another photosensitive component (that is, a photosensitive component other than the above-mentioned target photosensitive component) receives the laser light emitted by the opposite-end apparatus, this optional implementation can reduce the consumption of computing resources, and reduce the complexity of computing.

Optionally, the docking position may also be a position where another photosensitive component (that is, a photosensitive component other than the above-mentioned target photosensitive component) receives the laser light emitted by the above-mentioned opposite-end apparatus. Thus, based on the pre-stored position deviation between the target photosensitive component 12 and the above-mentioned docking position, and based on the position deviation between the target photosensitive component 12 and the photosensitive component 13 that receives the laser light, the processor 10 may compute the position deviation between the photosensitive component 13 that receives the laser light and the docking position (including the direction in which the docking apparatus is instructed to move and the distance the docking apparatus is instructed to move). After that, the processor 10 may control the above-mentioned docking apparatus 1 to move in accordance with the direction and distance included in the computed position deviation, so that to cause the above-mentioned docking apparatus 1 to be docked with the above-mentioned opposite-end apparatus 2.

In this embodiment, the arrangement of the above-mentioned plurality of photosensitive components may be arbitrary. For example, the arrangement of the above-mentioned plurality of photosensitive components may be set based on the shape and structure of the installation positions of the above-mentioned plurality of photosensitive components.

In some optional implementations of this embodiment, the above-mentioned plurality of photosensitive components are arranged in an array. For example, in the example of FIG. 1, the plurality of photosensitive components are arranged in a rectangular array.

It should be understood that when the plurality of photosensitive components are arranged in an array, the distances between adjacent photosensitive components are equal, and the photosensitive components are evenly distributed. In this way, the processor only needs to store the position information of a few photosensitive components and the space interval information between the photosensitive components, and the positions of all the photosensitive components may be determined based on the array arrangement to realize the rapid computing of the position deviation.

Figure 3:
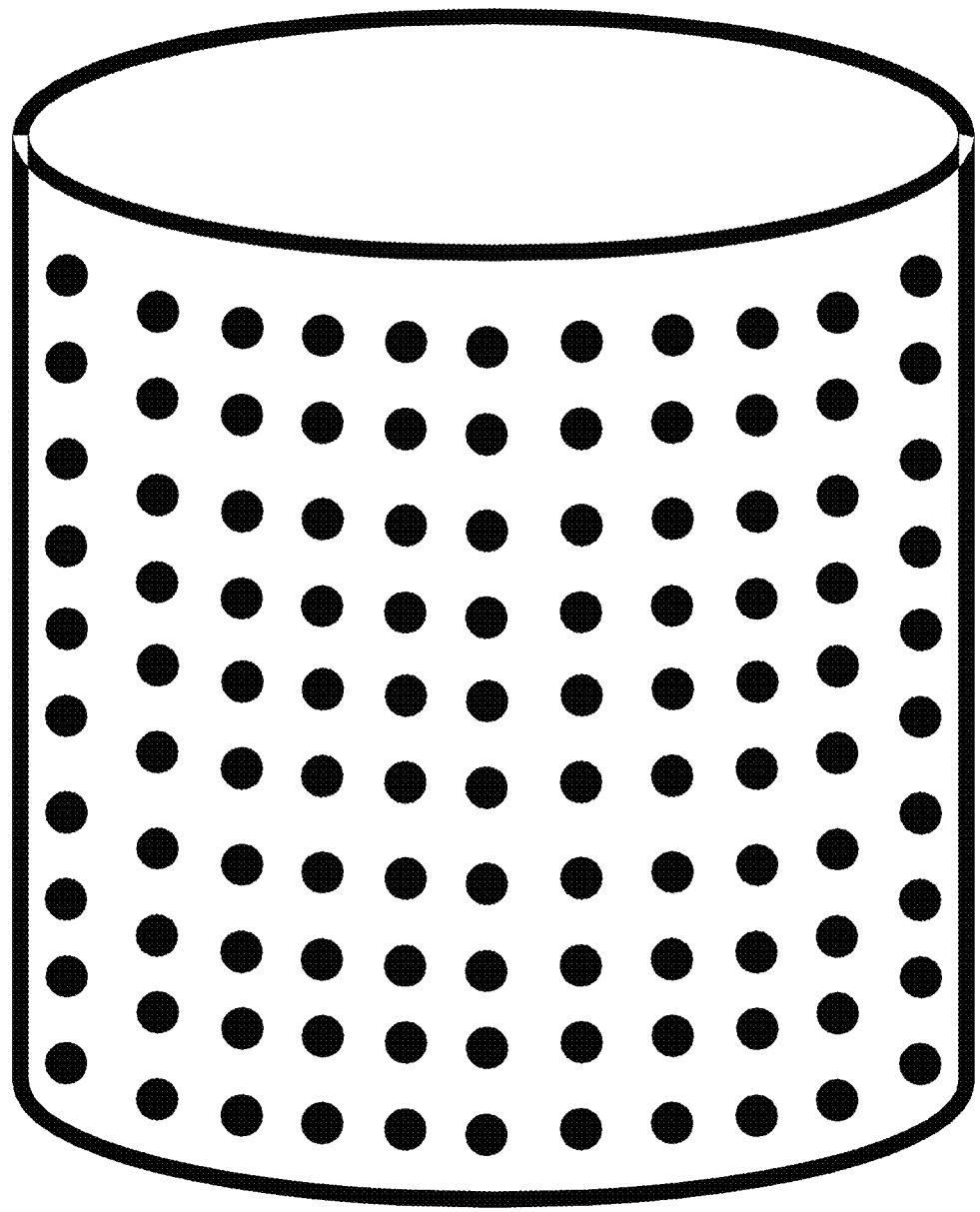
FIG. 3 is a schematic diagram of the arrangement of the plurality of photosensitive components included in the docking apparatus according to the present disclosure.

Optionally, when the mounting surface of the photosensitive components is not flat, the plurality of photosensitive components may also be arranged on the non-planar mounting surface randomly or be arranged on the non-planar mounting surface according to a preset rule. Please refer to FIG. 3 as an example. As shown in FIG. 3, the plurality of photosensitive components are arranged on a curved surface.

In this embodiment, the target photosensitive component 12 may be any one among the above-mentioned plurality of photosensitive components. In other words, the target photosensitive component 12 may be located at the position where any one of the above-mentioned plurality of photosensitive components is located. In practice, the photosensitive component that successfully receives the laser light emitted by the laser light transmitter of the opposite-end apparatus when the docking apparatus is docked with the opposite-end apparatus to be docked with the docking apparatus successfully may be selected as the target photosensitive component.

In some optional implementations of this embodiment, the above-mentioned target photosensitive component is located at the center of the array formed by the arrangement of the above-mentioned plurality of photosensitive components.

It may be understood that when the plurality of photosensitive components are arranged in an array, the target photosensitive component is located at the center of the array formed by the above-mentioned plurality of photosensitive components, and the situation where the laser light is received by the target photosensitive component is the successful docking state, conducive to realizing the docking by moving a shorter distance.

Particularly, if the target photosensitive component is arranged at the center of the array formed by the arrangement of the plurality of photosensitive components, the sum of the distances between the target photosensitive component and the other light-sensitive devices in the plurality of photosensitive components is usually smaller than the sum of the distances between the target photosensitive component and the other light-sensitive devices in the plurality of photosensitive components in a case of the target photosensitive component being not arranged at the center of the array formed by the arrangement of the plurality of photosensitive components. It is clear that if the target photosensitive component is arranged at the center of the array formed by the arrangement of the plurality of photosensitive components, the average distance between each photosensitive component of the plurality of photosensitive components and the target photosensitive component is smaller than that in the case of the target photosensitive component is not arranged at the center of the array formed by the arrangement of the plurality of photosensitive components. Thus, it helps to realize the docking by moving a shorter distance.

Here, the above-mentioned processor 10 may determine, from the above-mentioned plurality of photosensitive components, the photosensitive component that receives the laser light in a variety of ways.

In some optional implementations of this embodiment, the above-mentioned processor determines, from the above-mentioned plurality of photosensitive components, the photosensitive component that receives the laser light in the following manner:

Determining, from the above-mentioned plurality of photosensitive components, a photosensitive component with a voltage across the two ends thereof being greater than or equal to a preset voltage threshold as the photosensitive component that receives the laser light.

Particularly, exemplarily, in the case described below: a plurality of photosensitive components are arranged in an array. The target photosensitive component is located at the center of the array formed by the arrangement of the plurality of photosensitive components (the position of the target photosensitive component may be denoted as (i, j)). The row of the array formed by the arrangement of the plurality of photosensitive components includes 2i−1 photosensitive components (i is a positive integer), and the column includes 2j−1 photosensitive components (j is a positive integer). The photosensitive components in the plurality of photosensitive components shares same size, model, parameters and other attributes. When the processor measures the voltage across the two ends of a photosensitive component, this photosensitive component is communicated through a wire, and the wire connection with other photosensitive components other than this photosensitive component may be disconnected (exemplarily, ON and OFF of the circuit may be controlled by a switch). The total resistance in the conduction circuit except the photosensitive component is R1, and the power supply voltage is VDD.

When the photosensitive component does not receive the laser light, the resistance thereof R is very large, and R is much greater than R1. At this time, the voltage V across the two ends of the photosensitive component is: V=VDD*R1/(R+R1), that is, the voltage is approximately equal to 0;

When the photosensitive component receives the laser light, the resistance R is very small. At this time, the voltage V across the photosensitive component is: V=VDD.

It should be understood that the value of the above-mentioned preset voltage threshold should be a value that is located between (0, VDD] and capable of distinguishing whether the photosensitive component receives the laser light.

It should be noted that the above method of determining, from the plurality of is photosensitive components, the photosensitive component that receives the laser light is only exemplary. Other methods equivalent to the above-mentioned method may be used, according to implementation needs, to determine, from the plurality of photosensitive components, the photosensitive component that receives the laser light. In addition, other methods equivalent to the above-mentioned methods adopted by those skilled in the art should fall within the scope of protection claimed by the embodiments of the present disclosure.

In some optional implementations of this embodiment, the above-mentioned opposite-end apparatus stops emitting the laser light in response to determining that the above-mentioned docking apparatus is successfully docked with the above-mentioned opposite-end apparatus; and emits the laser light in response to determining that the above-mentioned docking apparatus is not docked with the above-mentioned opposite-end apparatus. In addition, the processor controls the above-mentioned opposite-end apparatus to suspend emitting the laser light, in response to determining that the above-mentioned docking apparatus is successfully docked with the above-mentioned opposite-end apparatus; and the processor controls the above-mentioned opposite-end apparatus to emit the laser light, in response to determining that the above-mentioned docking apparatus is not docked with the above-mentioned opposite-end apparatus.

Here, when the above-mentioned docking apparatus moves to the docking position calibrated by the above-mentioned target photosensitive component, the above-mentioned docking apparatus is successfully docked with the above-mentioned opposite-end apparatus.

It may be understood that since the laser light is used to determine whether the docking apparatus is successfully docked with the opposite-end apparatus, there is no need to emit the laser light when the above-mentioned docking apparatus is successfully docked with the above-mentioned opposite-end apparatus. When the above-mentioned docking apparatus is not docked with the above-mentioned opposite-end apparatus, the emission of the laser light is initiated. The emitting and stopping of the laser light may be controlled by the opposite-end apparatus or the processor on the docking apparatus.

In some optional implementations of this embodiment, a switch for controlling laser light emission is provided on the above-mentioned opposite-end apparatus, and the switch is turned off when the above-mentioned opposite-end apparatus and the above-mentioned docking apparatus are successfully docked, to suspend emitting the laser light. The switch is turned on when the opposite-end apparatus and the docking apparatus are not docked, to emit laser light.

It may be understood that when the opposite-end apparatus and the docking apparatus change from an undocked state to a successful docked state, the switch may be triggered to turn off; when the opposite-end apparatus and the docking apparatus switch change from the successful docking state to the undocked state, the switch may be triggered to turn on, so as to control the laser light emission.

In some optional implementations of this embodiment, the above-mentioned docking apparatus further includes a laser radar positioning system. Here, the processor 10 further controls, based on the relative position of the above-mentioned docking apparatus and the above-mentioned opposite-end apparatus determined by the laser radar positioning system, the above-mentioned docking apparatus to move to a position that allows a photosensitive component in the above-mentioned plurality of photosensitive components to receive the laser light emitted by the above-mentioned opposite-end apparatus.

It may be understood that in the prior art, the laser radar positioning system may roughly determine the relative position between the above-mentioned docking apparatus and the above-mentioned opposite-end apparatus. However, the precision of the relative position determined by the laser radar positioning system is often insufficient to achieve the detection of the precise docking position between the docking apparatus and the opposite-end apparatus, which makes it impossible to achieve electrical connection between the docking apparatus and the opposite-end apparatus at a precise docking position through the laser radar positioning system. This optional implementation may first control the above-mentioned docking apparatus to move to a position that allows a photosensitive component in the above-mentioned plurality of photosensitive components to receive the laser light emitted by the above-mentioned opposite-end apparatus, through the positioning of the laser radar positioning system; then control the docking apparatus to move to the docking position calibrated by the target photosensitive component based on the positional deviation between the photosensitive component that receives the laser light and the target photosensitive component, so that the above-mentioned docking apparatus is docked with the above-mentioned opposite-end apparatus. Thus, the problem of inability to locate an photosensitive component due to the area on which the plurality of photosensitive components are arranged is too small and thus the laser light cannot reach an photosensitive component.

In some optional implementations of this embodiment, the photosensitive component is a photoresistor or a photodiode.

It should be understood that, generally, the smaller the photosensitive component is and the smaller the distance between photosensitive components is, the higher precision of the docking can be achieved. For example, when the length, width, and height of the photosensitive component are all 1 mm, the precision in docking can reach 1 mm.

The docking apparatus in the above-mentioned embodiment of the present disclosure realizes the docking of the docking apparatus and the opposite-end apparatus by determining the position deviation between the photosensitive component that receives the laser light in the plurality of photosensitive components and the target photosensitive component, thereby improves the precision in docking the docking apparatus with the opposite-end apparatus.

Figure 4A:
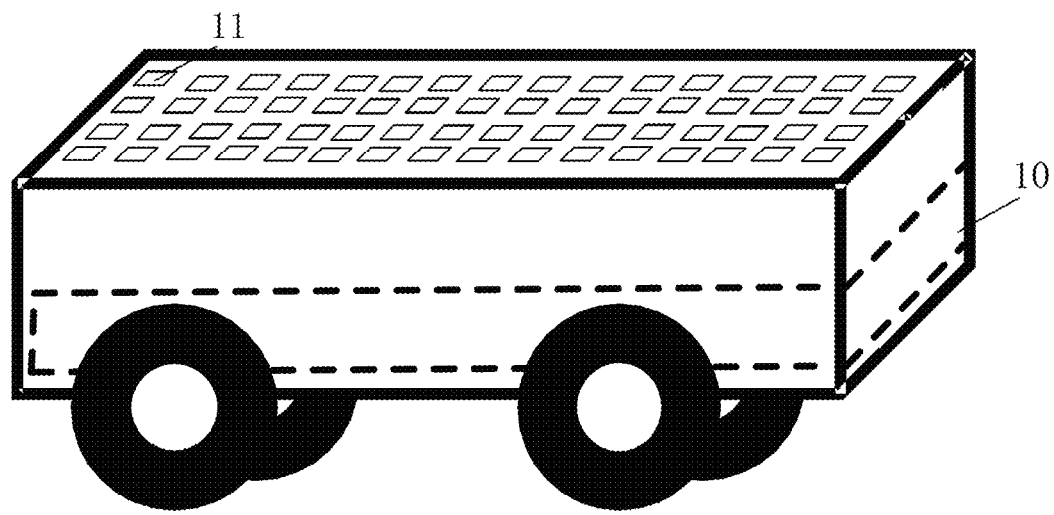
FIG. 4A is a schematic structural diagram of the mobile robot according to the present disclosure.
Figure 4B:
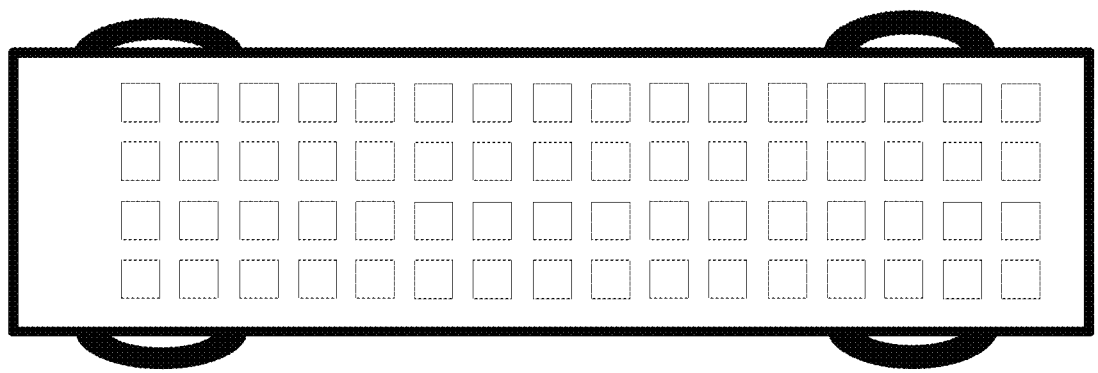
FIG. 4B is a top view of the mobile robot of FIG. 4A.

Embodiments of the present disclosure also provide a mobile robot. Refer further to FIGS. 4A and 4B.

FIG. 4A is a schematic structural diagram of a mobile robot according to the present disclosure. The mobile robot may include the docking apparatus described in the foregoing embodiment. The mobile robot shown in FIG. 4A includes a processor 10 and a plurality of photosensitive components 11 electrically connected to the processor 10.

FIG. 4B is a top view of the mobile robot of FIG. 4A. A plurality of photosensitive components are arranged on the upper side of the mobile robot.

In some optional implementations of this embodiment, the docking apparatus included in the above-mentioned mobile robot may be used as a movable chassis for carrying objects or other devices. The opposite-end apparatus to be docked with the docking apparatus may be a storage device (for example, a food cart, a delivery car). Here, the storage device may contain various objects such as medicines, goods, dinner plates, and the like, for example. The above-mentioned chassis and the above-mentioned storage device may constitute a detachable and movable delivery equipment.

Figure 5:
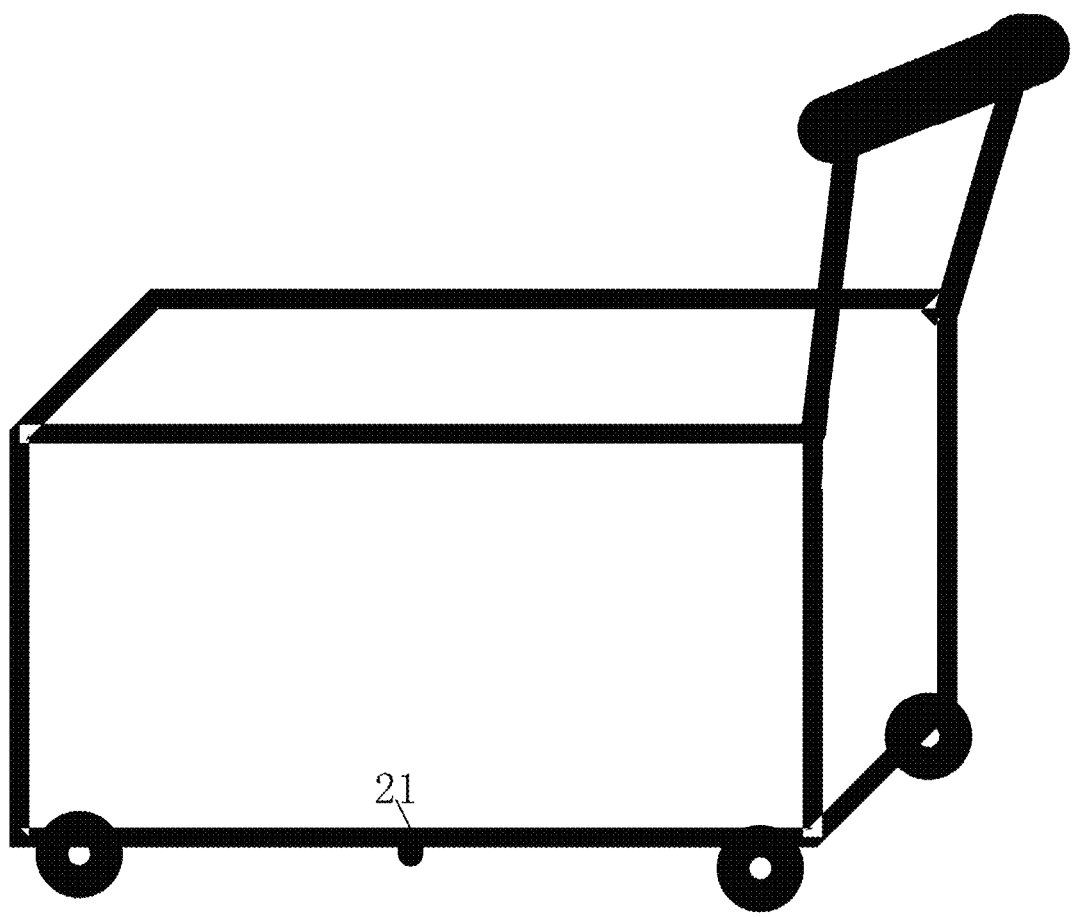
FIG. 5 is a schematic structural diagram of a opposite-end apparatus for docking with the mobile robot of the present disclosure.

As an example, please refer to FIG. 5, which is a schematic diagram of an exemplary application scenario of an opposite-end apparatus to be docked with the mobile robot of the present disclosure.

The opposite-end apparatus to be docked with the docking apparatus as shown in FIG. 5 includes the laser light transmitter 21. In some cases, the docking apparatus may be the chassis of a food delivery robot, and the opposite-end apparatus to be docked with the docking apparatus may be a food cart. In this application scenario, the food cart may be separated from the chassis to improve the efficiency of food transportation, and the precision between the docking between the food cart and the chassis can be improved, which helps to realize the electrical connection between the food cart and the chassis.

Figure 6:
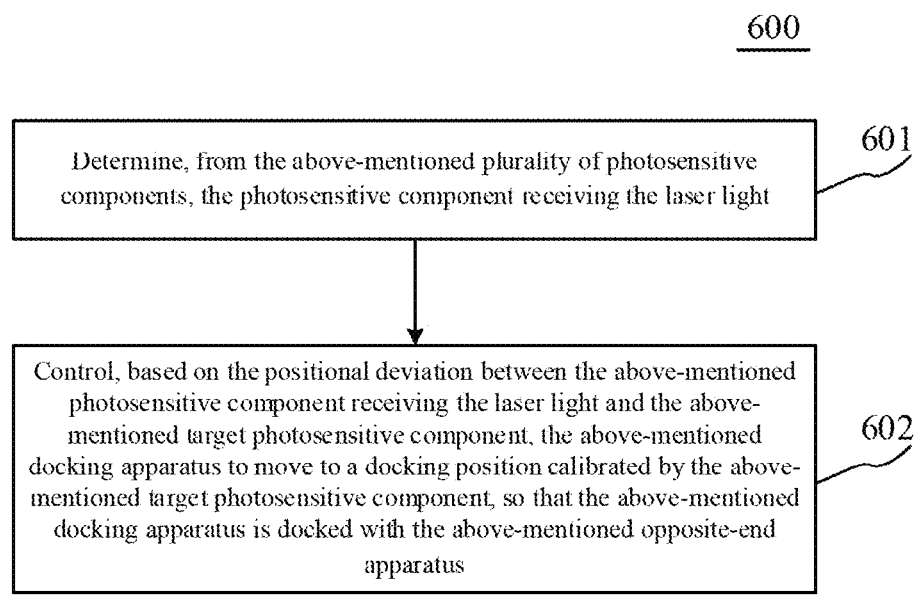
FIG. 6 is a flowchart of a docking method for the docking apparatus according to an embodiment of the present disclosure.

Please continue to refer to FIG. 6, which illustrates a process 600 of the docking method for the docking apparatus according to an embodiment of the present disclosure. Here, the above-mentioned docking apparatus includes a plurality of photosensitive components. The docking method for the docking apparatus includes the following steps:

Step 601: determining, from the above-mentioned plurality of photosensitive components, the photosensitive component that receives the laser light.

In this embodiment, the execution body of the docking method for the docking apparatus (for example, the processor shown in FIG. 1) may determine the photosensitive component that receives the laser light from the above-mentioned plurality of photosensitive components. Here, the above-mentioned laser light is emitted by an opposite-end apparatus that is to be docked with the above-mentioned docking apparatus.

In some optional implementations of this embodiment, the above-mentioned execution body may perform the above-mentioned step 601 in the following manner:

Determining, from the above-mentioned plurality of photosensitive components, a photosensitive component with a voltage across two ends thereof being greater than or equal to a preset voltage threshold as the photosensitive component that receives the laser light.

Particularly and exemplarily, in the case described below: a plurality of photosensitive components are arranged in an array. The target photosensitive component is located at the center of the array formed by the arrangement of the plurality of photosensitive components (the position of the target photosensitive component may be denoted as (i, j)). The row of the array formed by the arrangement of the plurality of photosensitive components includes 2i+1 photosensitive components (i is a natural number), and the column includes 2j+1 photosensitive components (j is a natural number). The photosensitive components in the plurality of photosensitive components shares same size, model, parameters and other attributes. When the processor measures the voltage across the two ends of the photosensitive component, this photosensitive component is communicated thereto by using a wire, and the wire connection with other photosensitive components other than this photosensitive component may be disconnected (exemplarily, ON and OFF of the circuit may be controlled by a switch). The total resistance in the conduction circuit except the photosensitive component is R1, and the power supply voltage is VDD.

When the photosensitive component does not receive the laser light, the resistance R is very large, and R is much greater than R1. At this time, the voltage V across the photosensitive component is: $V=VDD*R1/(R+R1)$, that is, the voltage is approximately equal to 0;

When the photosensitive component receives the laser light, the resistance R is very small. At this time, the voltage V across the photosensitive component is: $V=VDD$.

It should be understood that the value of the above-mentioned preset voltage threshold should be a value that is located between (0, VDD] and capable of distinguishing whether the photosensitive component receives the laser light.

It should be noted that the above method of determining, from the plurality of photosensitive components, the photosensitive component that receives the laser light is only exemplary. Other methods equivalent to the above-mentioned method may be used, according to implementation needs, to determine, from the plurality of photosensitive components, the photosensitive component that received the laser light. In addition, other methods equivalent to the above-mentioned methods adopted by those skilled in the art should fall within the scope of protection claimed by the embodiments of the present disclosure.

Step 602: controlling, based on the positional deviation between the above-mentioned photosensitive component that receives the laser light and the above-mentioned target photosensitive component, the above-mentioned docking apparatus to move to a docking position calibrated by the above-mentioned target photosensitive component, so that to cause the above-mentioned docking apparatus to be docked with the above-mentioned opposite-end apparatus.

In this embodiment, the execution body may control, based on the positional deviation between the above-mentioned photosensitive component that receives the laser light and the target photosensitive component, the above-mentioned docking apparatus to move to the docking position calibrated by the above-mentioned target photosensitive component, so that the above-mentioned docking apparatus is docked with the above-mentioned opposite-end apparatus.

In this embodiment, the target photosensitive component may be any one among the above-mentioned plurality of photosensitive components. In other words, the target photosensitive component may be located at the position where any one of the above-mentioned plurality of photosensitive components is located. In practice, the photosensitive component that successfully receives the laser light emitted by the laser light transmitter of the opposite-end apparatus when the docking apparatus and the opposite-end apparatus to be docked with the docking apparatus are successfully docked may be selected as the target photosensitive component.

It may be understood that, in this embodiment, the above-mentioned docking position may be calibrated by the target photosensitive component.

In some optional implementations of this embodiment, the above-mentioned docking position is a position where the above-mentioned target photosensitive component receives the laser light emitted by the above-mentioned opposite-end apparatus.

When the above-mentioned docking position is the position where the above-mentioned target photosensitive component receives the laser light emitted by the above-mentioned opposite-end apparatus, the distance the docking apparatus is instructed to move is the distance between the photosensitive component that receives the laser light and the target photosensitive component, and the direction in which the docking apparatus is instructed to move is a direction with the position of the target photosensitive component as the starting point and with the position of the photosensitive component that receives the laser light as the ending point. Thus, after obtaining the direction in which the docking apparatus is instructed to move and the distance the docking apparatus is instructed to move, the processor may control the above-mentioned docking apparatus to move based on the obtained direction and distance, so that the above-mentioned docking apparatus can be docked with the above-mentioned opposite-end apparatus.

It may be understood that, comparted with the solution that the docking position is a position where another photosensitive component (that is, a photosensitive component other than the target photosensitive component) receives the laser light emitted by the above-mentioned opposite-end apparatus, this optional implementation can reduce the consumption of computing resources and improve the accuracy of docking.

Optionally, the docking position may also be a position where another photosensitive component (that is, a photosensitive component other than the above-mentioned target photosensitive component) receives the laser light emitted by the above-mentioned opposite-end apparatus. Thus, based on the pre-stored position deviation between the target photosensitive component and the above-mentioned docking position, and based on the position deviation between the target photosensitive component and the photosensitive component that receives the laser light, the processor may compute the position deviation between the photosensitive component that receives the laser light and the docking position (including the direction in which the docking apparatus is instructed to move and the distance the docking apparatus is instructed to move). After that, the processor may control the above-mentioned docking apparatus to move in accordance with the direction and distance included in the computed position deviation, so as to cause the above-mentioned docking apparatus to be docked with the above-mentioned opposite-end apparatus.

The method provided in the above-mentioned embodiment of the present disclosure determines, from the above-mentioned plurality of photosensitive components, the photosensitive component that receives the laser light, where the laser light is emitted by the opposite-end apparatus to be docked with the above-mentioned docking apparatus; and then controls, based on the positional deviation between the above-mentioned photosensitive component that receives the laser light and the target photosensitive component, the above-mentioned docking apparatus to move to the docking position calibrated by the above-mentioned target photosensitive component, so that the above-mentioned docking apparatus is docked with the above-mentioned opposite-end apparatus, which improves the docking accuracy between the docking apparatus and the opposite-end apparatus.

Figure 7:
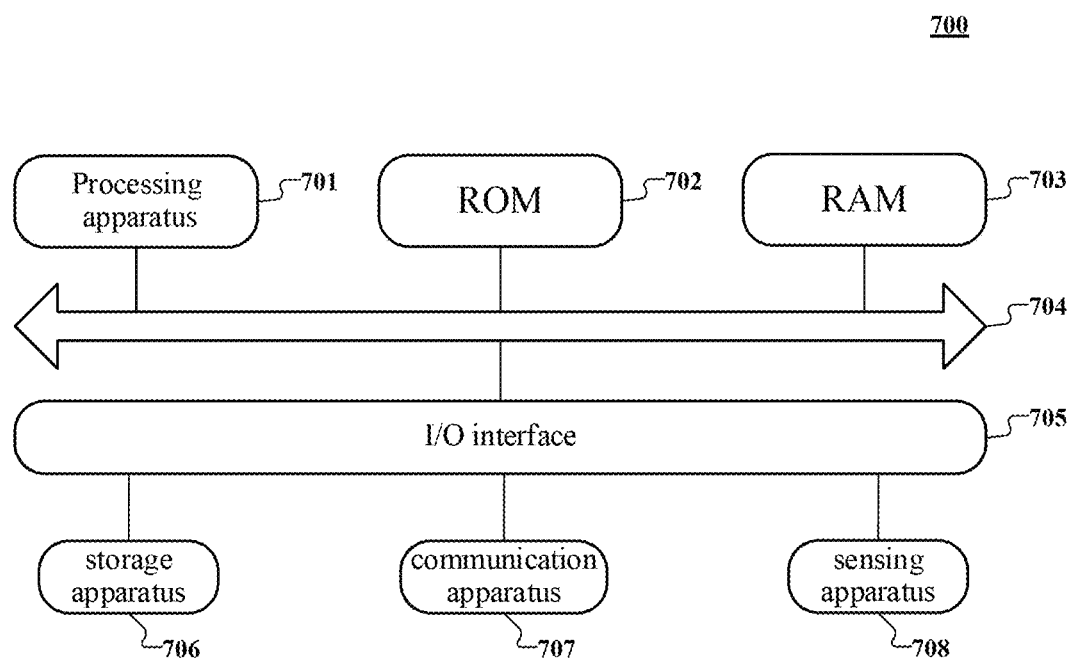
FIG. 7 is a schematic structural diagram of a computer system suitable for implementing an electronic device according to an embodiment of the present disclosure.

Referring now to FIG. 7, which shows a schematic structural diagram of an electronic device (for example, a mobile robot) 700 suitable for implementing embodiments of the present disclosure. The electronic device shown in FIG. 7 is only an example, and should not bring any limitation to the function and scope of application of embodiments of the present disclosure.

As shown in FIG. 7, the electronic device 700 may include a processing apparatus (such as a central processing unit, a graphics processor, or the like) 701, which may perform various appropriate actions and processing according to a computer program stored in a read-only memory (ROM) 702 or a computer program loaded from a storage apparatus 706 into a random access memory (RAM) 703. In the RAM 703, various programs and data required for the operation of the device 700 may also be stored. The processing apparatus 701, the ROM 702, and the RAM 703 are connected to each other through a bus 704. An input/output (I/O) interface 705 is also connected to the bus 704.

Generally, the following devices may be connected to the I/O interface 705: a communication apparatus 707, which may allow the electronic device 700 to communicate with other devices wirelessly or wiredly to exchange data; a sensing apparatus (for example, a plurality of photosensitive components electrically connected to the processing apparatus 701) 708, which may allow the electronic device 700 to obtain information from the outside (for example, the position of the photosensitive component that receives the laser light). Although FIG. 7 shows an electronic device 700 having various apparatuses, it should be understood that it is not required to implement or have all of the illustrated apparatuses. It may alternatively be implemented or provided with more or fewer apparatuses. Each block shown in FIG. 7 may represent one apparatus, or may represent a plurality of apparatuses as needed.

In particular, according to embodiments of the present disclosure, the process described above with reference to the flowchart may be implemented as a computer software program. For example, embodiments of the present disclosure include a computer program product, which includes a computer program carried on a computer-readable medium, and the computer program contains program codes for executing the method shown in the flowchart. In such an embodiment, the computer program may be downloaded and installed from the network through the communication apparatus 707, or installed from the storage apparatus 706, or installed from the ROM 702. When the computer program is executed by the processing apparatus 701, the above-mentioned functions defined in the method according to embodiments of the present disclosure are executed.

It should be noted that a computer readable medium as described by embodiments of the present disclosure may be a computer readable signal medium or a computer readable storage medium or any combination of the above two. For example, the computer readable storage media may be, but is not limited to, an electronic, magnetic, optical, electromagnetic, infrared, or semiconductor system, apparatus, or device, or any combination of the foregoing. More specific examples of the computer readable storage medium may include, but is not limited to, an electrical connection having one or more wires, portable computer disk, hard disk, random access memory (RAM), read only memory (ROM), erasable programmable read only memory (EPROM or flash memory), optical fiber, portable compact disk read only memory (CD-ROM), optical storage device, magnetic storage device, or any suitable combination of the foregoing. In the embodiments of the present disclosure, the computer readable storage medium may be a tangible medium, which may contain or store a program for use by the instruction execution system, apparatus, or device or in combination with the instruction execution system, apparatus, or device. In the embodiments of the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wired, optical cable, RF medium etc., or any suitable combination of the above.

The above-mentioned computer-readable medium may be included in the above-mentioned electronic device; or a stand-alone computer readable medium not assembled into the electronic device. The computer readable medium carries one or more programs. The one or more programs, when executed by the apparatus, cause the apparatus to: determine, from the above-mentioned plurality of photosensitive components, the photosensitive component that receives a laser light, where, the above-mentioned laser light is emitted by an opposite-end apparatus to be docked with the above-mentioned docking apparatus; and control, based on the positional deviation between the above-mentioned photosensitive component that receives the laser light and a target photosensitive component, the above-mentioned docking apparatus to move to a docking position calibrated by the above-mentioned target photosensitive component, so that the above-mentioned docking apparatus docks with the above-mentioned opposite-end apparatus.

The computer program codes used to perform the operations of the embodiments of the present disclosure may be written in one or more programming languages or a combination thereof. The programming languages include object-oriented programming languages such as Java, Smalltalk, C++, also include conventional procedural programming languages-such as "C" language or similar programming languages. The program code may be executed entirely on the user's computer, partly on the user's computer, executed as an independent software package, partly on the user's computer and partly executed on a remote computer, or entirely executed on the remote computer or server. In the case of a remote computer, the remote computer may be connected to the user's computer through any kind of network-including a local area network (LAN) or a wide area network (WAN), or it may be connected to an external computer (for example, using an Internet service provider to pass Internet connection).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the accompanying drawings. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system performing specified functions or operations, or by a combination of a dedicated hardware and computer instructions.

The above description is only an explanation for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the disclosure, for example, technical solutions formed by replacing the features as disclosed in the present disclosure with (but not limited to) technical features with similar functions.

What is claimed is:

1. A docking apparatus, comprising a processor and a plurality of photosensitive components electrically connected to the processor, wherein:
   the plurality of photosensitive components are arranged on a same mounting surface in an array, and the plurality of photosensitive components includes a target photosensitive component;
   the processor determines, from the plurality of photosensitive components, a photosensitive component that receives a laser light, wherein the laser light is emitted by an opposite-end apparatus to be docked with the docking apparatus; and
   the processor controls, based on a positional deviation between the photosensitive component that receives the laser light and the target photosensitive component that are arranged on the same mounting surface, the docking apparatus to move to a docking position at which the target photosensitive component receives the laser light emitted by the opposite-end apparatus, so that the docking apparatus docks with the opposite-end apparatus,
   the opposite-end apparatus stops emitting the laser light in response to determining that the docking apparatus is successfully docked with the opposite-end apparatus, and emits the laser light in response to determining that the docking apparatus is not docked with the opposite-end apparatus; or
   the processor further controls the opposite-end apparatus to suspend emitting the laser light in response to determining that the docking apparatus is successfully docked with the opposite-end apparatus, and the processor controls the opposite-end apparatus to emit the laser light in response to determining that the docking apparatus is not docked with the opposite-end apparatus.

2. The docking apparatus according to claim 1, wherein the plurality of photosensitive components are arranged on a same curved mounting surface.

3. The docking apparatus according to claim 1, wherein the processor determines, from the plurality of photosensitive components, the photosensitive component that receives the laser light by:
   determining, from the plurality of photosensitive components, a photosensitive component with a voltage across two ends thereof being greater than or equal to a preset voltage threshold as the photosensitive component that receives the laser light.

4. The docking apparatus according to claim 1, wherein:
   at least one photosensitive component in the plurality of photosensitive components has a different size from other photosensitive components in the plurality of photosensitive components.

5. The docking apparatus according to claim 1, wherein:
   a switch for controlling laser light emission is provided on the opposite-end apparatus,
   the switch is turned off in response to determining that the opposite-end apparatus and the docking apparatus are successfully docked, to suspend emitting the laser light; and
   the switch is turned on in response to determining that the opposite-end apparatus and the docking apparatus are not docked, to emit the laser light.

6. The docking apparatus according to claim 1, where the docking apparatus further includes a laser radar positioning system, wherein:
   the processor further controls, based on a relative position of the docking apparatus and the opposite-end apparatus determined by the laser radar positioning system, the docking apparatus to move to a position that allows a photosensitive component in the plurality of photosensitive components to receive the laser light emitted by the opposite-end apparatus.

7. The docking apparatus according to claim 1, wherein the photosensitive component is a photoresistor or a photodiode.

8. A mobile robot, comprising the docking apparatus according to claim 1.

9. A docking method for a docking apparatus, performed by a processor, where the docking apparatus including a plurality of photosensitive components, the plurality of photosensitive components are arranged on a same mounting surface in an array, and the plurality of photosensitive components includes a target photosensitive component, the method comprising:
   determining, from the plurality of photosensitive components, a photosensitive component that receives a laser light, wherein the laser light is emitted by an opposite-end apparatus to be docked with the docking apparatus; and
   controlling, based on a positional deviation between the photosensitive component that receives the laser light and the target photosensitive component that are arranged on the same mounting surface, the docking apparatus to move to a docking position at which the target photosensitive component receives the laser light emitted by the opposite-end apparatus, so that the docking apparatus docks with the opposite-end apparatus;
   wherein the method further comprises:
   the opposite-end apparatus stops emitting the laser light in response to determining that the docking apparatus is successfully docked with the opposite-end apparatus, and emits the laser light in response to determining that the docking apparatus is not docked with the opposite-end apparatus; or
   the processor further controls the opposite-end apparatus to suspend emitting the laser light in response to determining that the docking apparatus is successfully docked with the opposite-end apparatus, and the processor controls the opposite-end apparatus to emit the laser light in response to determining that the docking apparatus is not docked with the opposite-end apparatus.

10. The method according to claim 9, wherein, the determining, from the plurality of photosensitive components, a photosensitive component that receives a laser light, comprising:
    determining, from the plurality of photosensitive components, a photosensitive component with a voltage across two ends thereof being greater than or equal to a preset voltage threshold as the photosensitive component that receives the laser light.

11. An electronic device, comprising:
    one or more processors;
    a plurality of photosensitive components, in electronic connection with the one or more processors; and
    a memory device, stores one or more programs thereon, the one or more programs, when executed by the one or more processors, cause the one or more processors to implement the method according to claim 9.

12. A computer readable medium, storing a computer program thereon, wherein, the program, when executed by a processor, implement the method according to claim 9.

13. The electronic device according to claim 11, wherein the determining, from the plurality of photosensitive components, a photosensitive component that receives a laser light, comprising:

determining, from the plurality of photosensitive components, a photosensitive component with a voltage across two ends thereof being greater than or equal to a preset voltage threshold as the photosensitive component that receives the laser light.

14. The method according to claim 9, wherein the plurality of photosensitive components are arranged in an array, and the target photosensitive component is located at a center of the array formed by an arrangement of the plurality of photosensitive components.

15. The docking apparatus according to claim 1, wherein sizes of the plurality of photosensitive components are preset, and at least one of the plurality of photosensitive components has a size different from a size of other photosensitive components in the plurality of photosensitive components.

16. The docking apparatus according to claim 1, wherein the target photosensitive component is arranged at a center of the array formed by the plurality of photosensitive components.

17. The docking apparatus according to claim 1, wherein the plurality of photosensitive components are photoresistors or photodiodes.

* * * * *